July 24, 1923.
R. G. C. BOA
CALCULATING MACHINE
Filed Nov. 10, 1922
1,462,567
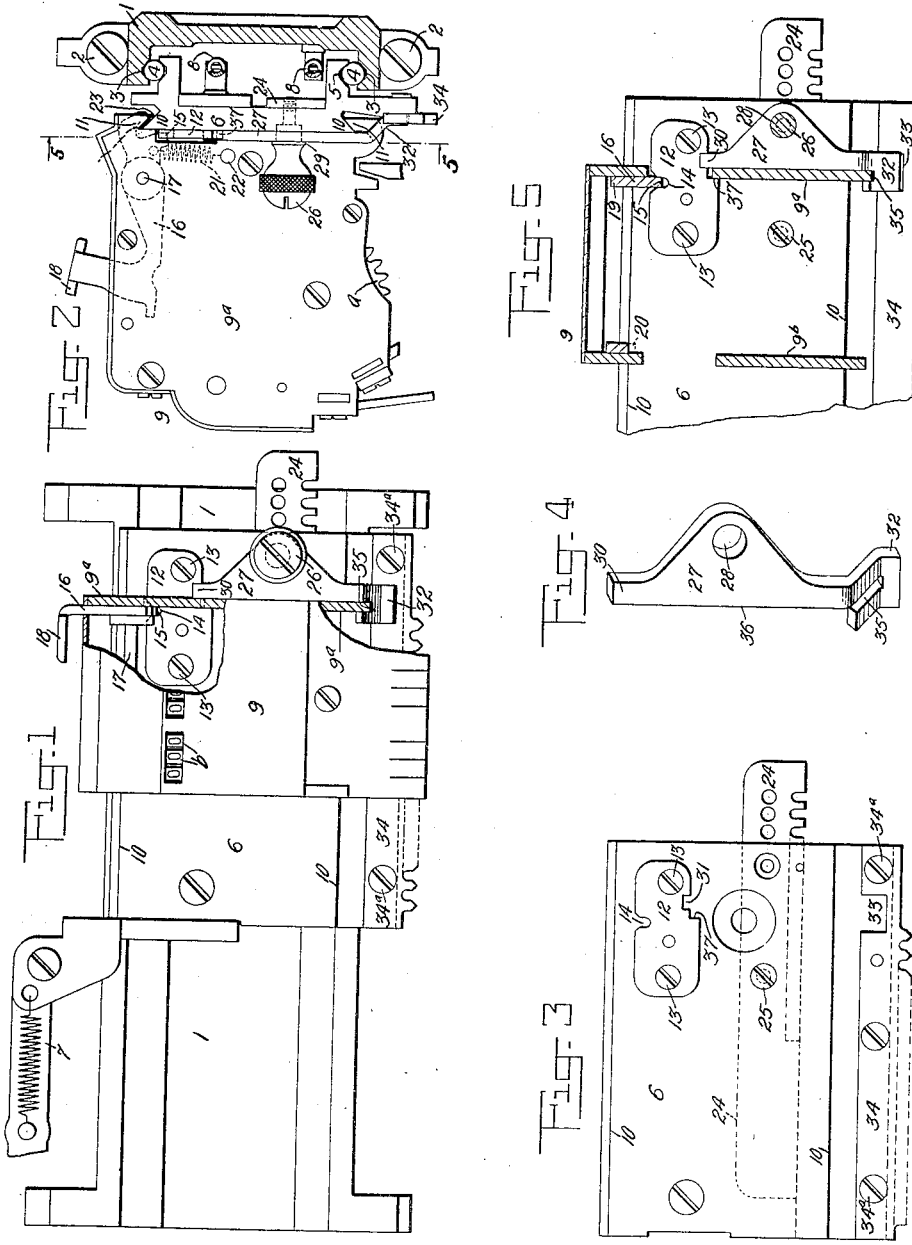
WITNESSES
INVENTOR
Robert G. C. Boa
By Jacob Felbel
HIS ATTORNEY Patented July 24, 1923.

1,462,567

UNITED STATES PATENT OFFICE.

ROBERT G. C. BOA, OF HERKIMER, NEW YORK, ASSIGNOR TO REMINGTON ACCOUNTING MACHINE CORPORATION, OF NEW YORK, N. Y., A CORPORATION OF NEW YORK.

CALCULATING MACHINE.

Application filed November 10, 1922. Serial No. 599,959.

*To all whom it may concern:*

Be it known that I, ROBERT G. C. BOA, citizen of the United States, and resident of Herkimer, in the county of Herkimer and State of New York, have invented certain new and useful Improvements in Calculating Machines, of which the following is a specification.

My invention relates to calculating machines and more particularly to means for firmly, though detachably, connecting a totalizer to its truck or carrier.

The object of my invention, generally stated, is to provide simple and highly efficient means of the character specified.

To the above and other ends which will hereinafter appear, my invention consists in the features of construction, arrangements of parts and combinations of devices set forth in the following specification and particularly pointed out in the appended claims.

In the accompanying drawings, wherein like reference characters indicate corresponding parts in the different views, Figure 1 is a detail front elevation, with parts sectioned away, of a portion of a calculating machine embodying my invention.

Figure 2 is an end elevation of the same with the truck support in section.

Figure 3 is a detail front elevation of the truck.

Figure 4 is a detail perspective view of the locking plate or member of my invention.

Figure 5 is a fragmentary transverse sectional view taken on the line 5—5 of Fig. 2 and looking in the direction of the arrows at said line.

I have shown my invention in the present instance embodied in a Remington accounting machine of the character represented in the patent to J. C. Wahl, No. 1,270,471, dated June 25, 1918, in which machine the invention may be readily embodied with but slight modification of the structural features of said machine as they now exist. It should be understood, however, that the invention is not restricted to its embodiment in that machine.

It has been customary in the Remington accounting machine to employ a spring latch to lock each totalizer in position on its truck whether the totalizer be on the main truck or cross truck. It also has been customary to employ on each totalizer an auxiliary spring loop that may be turned on its pivot and thrown into and out of engagement with the finger piece of the spring latch and when engaging the latter prevent the spring latch from being accidentally disengaged and freeing its totalizer.

Moreover, the spring latch on each totalizer locked to the truck at the top of the totalizer and not at the bottom. These constructions presented certain disadvantages which will hereinafter appear, and which it is the main object of my invention to overcome by providing simple means for effectively and firmly securing a totalizer to its truck at both top and bottom and without the aid of the spring loops hereinbefore referred to.

In the accompanying drawings I have shown only so much of a Remington accounting machine as is necessary to arrive at an understanding of my invention in its embodiment therein. While the invention is intended more particularly for detachably securing a cross totalizer to the cross truck and is thus disclosed in the present instance, it should be understood that the invention is not restricted to use with a cross truck.

The usual supporting and guide bar 1 is fixedly secured by screws 2 and other means, not shown, to an actuator frame which in turn is secured to the frame of the typewriting machine. This supporting bar 1 has oppositely disposed guideways 3 in which bearing balls 4 travel; said balls also coacting with opposite guideways 5 in a truck or carrier 6. In the present instance this truck is the usual cross truck of a Remington accounting machine, which as disclosed in said Wahl patent is intermittently picked up by its pick-up beam 7 and moved from right to left with the main carriage or truck. At a predetermined point in this movement the beam 7 is released and the truck 6 is free to be returned to normal position, shown in Fig. 1, by the usual spring 8. Detachably fixed to the cross truck is a cross totalizer designated as a whole by the reference numeral 9 and comprising a series of coaxially arranged wheels $a$ contained in a frame including side plates $9^a$ and $9^b$ suitably united and enclosing number wheels $b$ to which motion is transmitted from the wheels $a$. This totalizer usually has a predetermined position on the cross truck, although it is detachably fixed to the truck so that one totalizer may be detached and another of a different kind or capacity substituted therefor. The usual construction includes a totalizer supporting portion of the truck which is dove-tail in cross section, as indicated at 10, and which is received in correspondingly shaped openings formed in the side plates 9ª and 9ᵇ of the totalizer frame providing hook-like engaging portions 11 thereon. By these means the totalizer may be slipped over the right-hand end of the dove-tail and have a sliding adjustment along the truck until the totalizer is properly positioned thereon. This position is usually determined by a plate 12 secured by screws 13 to the front face of the truck and provided with a locking notch 14 in the upper edge thereof and with means for limiting the sliding adjustment of the truck as will hereinafter appear. A catch, latch or locking member 15 carried by the totalizer engages this notch 14, as shown in the drawing, and prevents displacement of the totalizer along the truck in either direction. This catch forms part of a lever 16 fixed on a rock shaft 17 mounted to turn in the end plates of the totalizer frame. The lever 16 is also provided with a finger piece 18 and with a hook-like catch 19 that engages over the upper edge of the dove-tail portion 10 of the truck, as shown in Fig. 2. A second hook-like catch 20, that corresponds to the catch 19 and engages the truck in a like manner, is fixedly mounted on the opposite end of the shaft 17 next to the inner face of the side plate 9ᵇ of the totalizer frame, as shown in Fig. 5. A contractile spring 21 is connected at one end to the lever 16 and at its opposite end to a pin 22 fixed to the totalizer frame. This spring tends to turn the shaft 17 in a clockwise direction, as the parts are viewed in Fig. 2, and to maintain the catches 15, 19 and 20 in their engaging positions.

The repeated jarring of the parts, as the cross truck is suddenly arrested in its free return movement, is liable to bring about a disengagement of these catches, allowing an accidental displacement of the totalizer on the truck. It has been customary to employ, as pointed out above, an additional spring loop on top of the totalizer adapted to be thrown into and out of co-operation with the finger piece 18 to add further resistance to the accidental displacement of the catches; but even when such additional spring loop is employed the catches at times jar loose and disengage.

It will be seen, moreover, that the catches engage the truck only near the top of the totalizer, and there are no means at the bottom of the totalizer for preventing its displacement longitudinally of the truck. The spring 21 acting through the hook-like catches 19 and 20 tends to draw the lower engaging members 11 of the totalizer up against the lower portion of the dove-tail 10 on the truck, thus leaving a slight space 23 between the upper engaging portions 11 of the totalizer frame and the upper section of the dove-tail 10 on the truck, as shown in Fig. 3. Under a jarring action this space enables the totalizer to receive a slight twisting or skewing displacement on the truck, thus throwing the wheels a of the totalizer out of the exact position in which they should be maintained on the truck for proper successive meshing engagement with the master wheel by which they are turned.

By my present invention I overcome these disadvantages and firmly, though detachably, fix the totalizer to the truck and prevent any accidental movement whatever of the totalizer on its truck no matter how severe the jar to which the truck and totalizer are subjected in the operation of the machine, as will hereinafter appear.

In addition to the foregoing features of that form of Remington accounting machine disclosed in the above mentioned Wahl patent, said machine includes a longitudinal adjustable stop bar 24 secured in its adjusted position on the truck by two screws, one of which is indicated at 25. The free projecting end of this bar coacts with a part not shown to arrest the truck in its movement to the right. In accordance with my present invention I replace one of the screws 25 by a shouldered thumb screw 26 that performs the same office which the screw it replaces did, and in addition detachably secures a locking or holding plate, clip or member 27 in place on the front face of the truck 6. This is a sheet metal plate shown in detail in Fig. 4 and it has an opening 28 through which the stem of the thumb screw 26 extends with a snug fit; a shoulder 29 on the screw bearing against the locking plate and clamping it firmly against the front face of the truck. The locking plate 27 interlocks with the truck at its lower as well as at its upper end and also is firmly held at its middle by the screw 26 as just described. In incorporating the invention in the Remington accounting machine the interlocking of the plate 27 with the truck may be conveniently effected by snugly seating the upper reduced end 30 of the locking plate in a locking notch, recess or seat 31 which I cut for this purpose in the lower edge of the plate 12. The lower end portion 32 of the locking plate is preferably bent rearwardly so that it may extend beneath the lower dove-tail portion 10 into a cutout, recess, notch or seat 33 which I make for the purpose in the usual rack 34, which rack is secured to the lower front face of the truck by screws 34ª. In this manner the locking plate is firmly held at three points against movement in the plane thereof in any direction. A vertical slot, seat or recess 35 is made in the lower end portion of the locking plate 27, said slot being coincident with the left-hand straight vertical edge 36 of the plate; a continuation of said edge forming the right-hand side wall of the slot. As shown in the drawings this slot is adapted to receive the lower rear portion of the right-hand side plate 9ᵃ of the totalizer frame and embrace it on both sides and interlock therewith when the totalizer is locked in place. I retain the usual contact shoulder or abutment 37 formed on the plate 12 for the inner face of the right-hand side plate 9ᵃ to abut against and limit the sliding movement or adjustment of the totalizer from right to left, and thus aid in positioning the totalizer so that the latch 15 will register with the locking notch 14, as shown in Fig. 5.

In placing the totalizer 9 on the truck 6, whatever may be the width of the totalizer, the finger piece 18 is depressed and the totalizer slipped over the right-hand end of the dove-tail 10. The totalizer is then slid along the dove-tail until the plate 9ᵃ reaches the abutment 37, arresting further sliding movement of the totalizer. The finger piece 18 is then released, allowing the catch 15 to engage the locking recess 14 and the catches 19 and 20 to engage over the edge of the upper dove-tail portion 10. The locking plate 27 is then moved rearwardly into place with its parts 30 and 32 seated respectively in the notches 31 and 33, and the end plate 9ᵃ seated in the slot 35 in the locking plate. The thumb screw 26 is then introduced into position and screwed home firmly holding the locking plate in place. The end plate 9ᵃ of the totalizer frame is at this time confined between the bearing surfaces on opposite sides thereof attached to the truck and comprising at the bottom the side walls of the slot 35 of the locking plate, and at its upper part the side edge 36 of the plate 27 and the shoulder 37 on the plate 12. In addition the locking latch 15 is confined on opposite sides by the side walls of the locking notch 14.

It will be seen therefore that when the totalizer is locked in place a firm interlocking connection is established between the totalizer and the truck at the bottom, as well as at termediate the top and bottom, as well as at the top of the totalizer, to prevent its displacement along the truck in either direction; the usual dove-tail connection effectively preventing any relative displacement of the totalizer fore-and-aft of the machine. By use of these devices I may dispense entirely with the use of the spring loop usually employed on the totalizer to coact with the finger piece.

In order to detach the totalizer it is merely necessary to remove the thumb screw 26 and plate 27, depress the finger piece 18 and slide the totalizer to the right off the dove-tail 10.

From what has been said it will be understood that only few and simple changes, such as the addition of the notches 31 and 33 to the existing structure are necessary for the embodiment of the features of my invention in existing machines.

What I claim as new and desire to secure by Letters Patent, is:—

1. In a calculating machine, the combination of a carrier, a totalizer detachably supported for sliding adjustment along said carrier to its position of use, and means for firmly holding said totalizer on the carrier comprising an independently detachable locking member detachably fixed to the carrier and having an interlocking engagement with said totalizer.

2. In a calculating machine, the combination of a truck, a totalizer detachably supported on said truck, and means for firmly holding said totalizer on the truck comprising an independently detachable member having an interlocking engagement with the truck at a plurality of points and also having interlocking engagement with said totalizer.

3. In a calculating machine, the combination of a truck, a totalizer detachably supported on said truck, and means for firmly holding said totalizer on the truck comprising a locking plate having an interlocking engagement at top and bottom with said truck and also having means for effecting an interlocking engagement with the totalizer, and means for detachably holding said locking plate on the truck and in interlocking engagement with the totalizer.

4. In a calculating machine, the combination of a truck, a totalizer supported for sliding adjustment along said truck to a position of use, and means for firmly holding the totalizer on the truck and against displacement from its position of use, said means comprising a locking plate, seats on the truck in which said locking plate is adapted to be seated, means on the locking plate adapted to interlock with the totalizer, and means for detachably holding the locking plate in said seats on the truck.

5. In a calculating machine, the combination of a truck, a totalizer detachably supported on said truck, and means for firmly holding said totalizer on the truck comprising a locking plate having a slot adapted to receive a portion of the frame of the totalizer and embrace it on opposite sides, means on the truck with which said locking plate interlocks, and means for firmly though detachably holding said locking plate on the truck and in engagement with the interlocking means thereon.

6. In a calculating machine, the combination of a truck, a totalizer detachably supported on said truck, and means for firmly holding said totalizer on the truck comprising a locking plate separate and distinct from the truck and totalizer, means for securing said plate to the truck for independent detachment therefrom, and means whereby when said plate is secured to the truck it will interlock therewith and with the totalizer.

7. In a calculating machine, the combination of a truck, a totalizer detachably supported on said truck, and means for firmly holding said totalizer on the truck comprising a locking member which when in place extends transversely of the truck and is independently detachable therefrom, seats on the truck in which the ends of said locking member may be seated, a seat on the locking member in which a portion of the totalizer frame may be seated, and means for detachably holding said locking member on the truck.

8. In a calculating machine, the combination of a truck, a totalizer supported for sliding adjustment along said truck to a position of use, and means for firmly holding the totalizer on the truck and against displacement from its position of use, said means comprising a sheet metal locking plate which when in place extends transversely of the truck on the front face thereof and against which a side of the totalizer is adapted to bear, seats on the truck in which the ends of the locking bar may be seated, a seat on the locking bar in which a part of the frame of the totalizer may be seated, and a clamping screw for holding said locking plate in the seats on the truck.

9. In a calculating machine, the combination of a truck, a totalizer supported for sliding adjustment along said truck to a position of use, and means for firmly holding the totalizer on the truck and against displacement from its position of use, said means comprising a spring latch on the totalizer, a plate on the truck with a locking recess in which said latch is received, a shoulder on said plate against which a side plate of the totalizer frame abuts when the spring latch registers with its locking recess, and a locking plate detachably secured to the truck and co-acting with said side plate of the totalizer frame on the opposite side thereof from that with which said shoulder coacts.

10. In a calculating machine, the combination of a truck, a totalizer supported for sliding adjustment along said truck to a position of use, and means for firmly holding the totalizer on the truck and against displacement from its position of use, said means comprising a spring latch on the totalizer, a plate on the truck with a locking recess in which said latch is received, a shoulder on said plate against which the totalizer abuts when the spring latch registers with its locking recess, a locking plate, and means whereby said locking plate may be detachably fixed to the truck in interlocking engagement therewith and with the totalizer when the latter is locked in position by its spring latch.

11. In a calculating machine, the combination of a truck, a totalizer supported for sliding adjustment along said truck to a position of use, and means for firmly holding the totalizer on the truck and against displacement from its position of use, said means comprising a locking plate co-acting with a part of the totalizer frame to hold the totalizer against movement along the truck in either direction, and means for detachably fixing the locking plate against movement on the truck.

12. In a calculating machine, the combination of a truck, a totalizer supported for sliding adjustment along said truck to a position of use, and means for firmly holding the totalizer on the truck and against displacement from its position of use, said means comprising a latch on the totalizer near the top thereof to engage the truck and prevent a displacement of the totalizer along the truck in either direction, and a locking member detachably fixed to the truck and engaging the frame of the totalizer to prevent a displacement of the totalizer in either direction along the truck.

13. In a calculating machine, the combination of a truck, a totalizer supported for sliding adjustment along said truck to a position of use, and means for firmly holding the totalizer on the truck and against displacement from its position of use, said means comprising a notched plate fixed to the front of the truck and which co-acts with the totalizer to limit its sliding movement in one direction along the truck, a locking plate engaging in a notch in said notched plate and coacting with the totalizer to prevent a sliding movement thereof on the truck in the opposite direction, and means for firmly but detachably securing said locking plate to the truck.

14. In a calculating machine, the combination of a truck, a totalizer supported for sliding adjustment along said truck to a position of use, and means for firmly holding the totalizer on the truck and against displacement from its position of use, said means comprising a notched plate fixed to the front of the truck and which coacts with the totalizer to limit its sliding movement in one direction along the truck, a locking plate seated at its upper end in a notch in said notched plate and at its lower end in another notch in the truck and having at its lower end portion a slot in which a side plate of the totalizer frame is adapted to be seated, and a thumb screw for firmly but detachably securing said locking plate to the front face of the truck when the totalizer is positioned against said notched plate.

15. The combination with a totalizer and its carrier, of a holding plate having a notch in which to seat a side plate of said totalizer, and means for detachably interlocking said holding plate with said carrier.

Signed at Ilion, in the county of Herkimer, and State of New York, this 7th day of November, A. D. 1922.

ROBERT G. C. BOA.

Witnesses:
 FRANK BURGOR,
 HARRY L. COUCH.